United States Patent
Hiraoka

(10) Patent No.: US 9,574,097 B2
(45) Date of Patent: *Feb. 21, 2017

(54) NON-AQUEOUS PHOTOPOLYMERIZABLE INKJET INK AND INK CARTRIDGE

(71) Applicant: RICOH COMPANY, LTD., Tokyo (JP)

(72) Inventor: Takao Hiraoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 47 days.

This patent is subject to a terminal disclaimer.

(21) Appl. No.: 14/376,091

(22) PCT Filed: Feb. 27, 2013

(86) PCT No.: PCT/JP2013/056198
§ 371 (c)(1),
(2) Date: Jul. 31, 2014

(87) PCT Pub. No.: WO2013/129699
PCT Pub. Date: Sep. 6, 2013

(65) Prior Publication Data
US 2015/0042731 A1    Feb. 12, 2015

(30) Foreign Application Priority Data

Mar. 2, 2012    (JP) .................. 2012-046301

(51) Int. Cl.
*B41J 2/21* (2006.01)
*C09D 11/30* (2014.01)
(Continued)

(52) U.S. Cl.
CPC ............ *C09D 11/30* (2013.01); *B41J 2/17503* (2013.01); *B41J 2/2107* (2013.01); *C09D 11/101* (2013.01)

(58) Field of Classification Search
CPC ........... B41J 2/01; B41J 2/0057; B41J 2/1433; B41J 2/17; B41J 2/1755; B41J 2/17593; B41J 2/21; B41J 2/211; B41J 2/2107; B41J 2/2114; B41J 2/2117; B41J 2/2056; B41J 11/0015; B41J 11/002; B41J 3/60; B41M 5/0011; B41M 5/0017; B41M 5/52; B41M 5/5218; B41M 7/00; B41M 7/0072; B41M 7/0081; B41M 7/009; C09D 11/005; C09D 11/30; C09D 11/32; C09D 11/322; C09D 11/328; C09D 11/36; C09D 11/38; C09D 11/40; C09D 11/52; C09D 11/54; C09D 11/101
(Continued)

(56) References Cited

U.S. PATENT DOCUMENTS

| 9,120,940 | B2 * | 9/2015 | Hiraoka | ............ C09D 11/101 |
| 2002/0121631 | A1 * | 9/2002 | Rahman | ............ B41M 7/0045 |
| | | | | 252/500 |

(Continued)

FOREIGN PATENT DOCUMENTS

| CA | 2 835 076 A1 | 12/2012 |
| EP | 2 371 910 A1 | 10/2011 |

(Continued)

OTHER PUBLICATIONS

Extended Search Report issued Jan. 22, 2015 in European Patent Application No. 13754996.0.
(Continued)

*Primary Examiner* — Manish S Shah
(74) *Attorney, Agent, or Firm* — Oblon, McClelland, Maier & Neustadt, L.L.P.

(57) ABSTRACT

A non-aqueous photopolymerizable inkjet ink, including as a photopolymerizable monomer: (a) ethylene glycol dimethacrylate; and (b) caprolactone-modified dipentaerythritol hexaacrylate or ethylene oxide-modified trimethylolpropane tri-methacrylate, or both thereof, wherein the ink includes
(Continued)

the (a) component by 10% by mass to 95% by mass with respect to the entire photopolymerizable monomer, and the ink includes the (b) component by 5% by mass to 90% by mass with respect to the entire photopolymerizable monomer, and wherein the ink does not include a diluting solvent.

9 Claims, 1 Drawing Sheet

(51) Int. Cl.
 *C09D 11/101* (2014.01)
 *B41J 2/175* (2006.01)

(58) Field of Classification Search
 USPC ..... 347/9–22, 88, 95–105; 106/31.13, 31.27, 106/31.6, 31.85, 31.77; 523/160, 161
 See application file for complete search history.

(56) References Cited

U.S. PATENT DOCUMENTS

| | | | |
|---|---|---|---|
| 2004/0019128 A1* | 1/2004 | Kondo | C09D 11/101 522/167 |
| 2004/0145639 A1 | 7/2004 | Noutary | |
| 2006/0160917 A1* | 7/2006 | Oyanagi | C09D 11/101 522/7 |
| 2007/0197685 A1* | 8/2007 | Aruga | C09D 11/322 523/160 |
| 2008/0103254 A1* | 5/2008 | Asada | C09D 11/101 524/832 |
| 2008/0200578 A1 | 8/2008 | Noutary | |
| 2009/0087626 A1 | 4/2009 | Hayata et al. | |
| 2009/0118388 A1* | 5/2009 | Naruse | C09D 11/101 522/39 |
| 2011/0242191 A1 | 10/2011 | Mochizuki | |
| 2012/0086762 A1 | 4/2012 | Noguchi et al. | |
| 2012/0147103 A1 | 6/2012 | Hasegawa et al. | |
| 2012/0176456 A1 | 7/2012 | Maekawa et al. | |
| 2012/0200648 A1* | 8/2012 | Hiraoka | C09D 11/324 347/86 |
| 2012/0242768 A1 | 9/2012 | Seno et al. | |
| 2012/0293589 A1* | 11/2012 | Hiraoka | B41J 2/17553 347/86 |
| 2013/0065024 A1 | 3/2013 | Aruga et al. | |
| 2014/0160215 A1 | 6/2014 | Saito et al. | |

FOREIGN PATENT DOCUMENTS

| | | |
|---|---|---|
| JP | 2004-182808 | 7/2004 |
| JP | 2004-526820 | 9/2004 |
| JP | 2004-285161 | 10/2004 |
| JP | 2008-133422 A | 6/2008 |
| JP | 2009-040955 | 2/2009 |
| JP | 2012-140593 | 7/2012 |
| JP | 2012-251123 | 12/2012 |
| JP | 2013-095910 | 5/2013 |
| RU | 2 294 553 C2 | 2/2007 |
| WO | WO2012/153867 A1 | 11/2012 |
| WO | WO2013/069580 A1 | 5/2013 |

OTHER PUBLICATIONS

International Search Report Issued Jun. 4, 2013 for counterpart International Patent Application No. PCT/JP2013/056198 Filed Feb. 27, 2013.
U.S. Appl. No. 14/310,452, filed Jun. 20, 2014 Inventor: Kohzuki, et al.
Korean Office Action issued Sep. 11, 2015 in Patent Application No. 10-2014-7023367 (with English Translation).
Combined Office Action and Search Report issued on Nov. 11, 2015 in Russian Patent Application No. 2014139844/05(064525) with English translation.
Canadian Office Action issued Aug. 24, 2015 in Patent Application No. 2,866,026.

* cited by examiner

NON-AQUEOUS PHOTOPOLYMERIZABLE INKJET INK AND INK CARTRIDGE

TECHNICAL FIELD

The present invention relates to a non-aqueous photopolymerizable inkjet ink and an ink cartridge.

BACKGROUND ART

Photopolymerizable inkjet inks containing (meth)acrylic esters, and photopolymerizable inkjet inks containing (meth)acrylic esters and vinyl ethers in combination have been widely known (see, for example, PTL 1).

However, many of the monomers used in such conventional photopolymerizable inkjet inks have toxicity. In particular, most of (meth)acrylic esters, which are inexpensive and easily procured, exhibit high skin sensitization, causing allergy on a skin brought into contact with them, but conventional art has not provided any solution to this problem.

Reducing viscosity of a photopolymerizable inkjet ink may be easily achieved by adding a diluting solvent, but the solvent released into the atmosphere by volatilization is not desirable in view of environmental impact.

A photopolymerizable water-based inkjet ink blended with water is heretofore known, but penetration drying on an impermeable substrate is not expected as described later. As a result, it requires a step of evaporating water for faster and more efficient process, requiring installation of heat source and so on, which is not desirable in view of energy conservation.

For further improvement of the performance of the photopolymerizable inkjet ink, it has been desired to improve strength of a cured film thereof by increasing durability against abrasion and to reduce viscosity thereof to so as not to interfere with inkjet discharge despite being thickened due to blending with various materials such as pigments and additives.

CITATION LIST

Patent Literature

PTL 1 Japanese Patent Application Laid-Open (JP-A) No. 2004-526820

SUMMARY OF INVENTION

Technical Problem

The present invention aims at solving the conventional problems and achieving the following objective. That is, the present invention aims at providing a non-aqueous photopolymerizable inkjet ink which involves no skin sensitization and has low viscosity and improved strength in a cured film.

Solution to Problem

Means for solving the problems are as follows. That is,
A non-aqueous photopolymerizable inkjet ink of the present invention includes, as a photopolymerizable monomer: (a) ethylene glycol dimethacrylate; and (b) caprolactone-modified dipentaerythritol hexaacrylate or ethylene oxide-modified trimethylolpropane trimethacrylate, or both thereof, wherein the ink includes the (a) component by 10% by mass to 95% by mass with respect to the entire photopolymerizable monomer, and the ink includes the (b) component by 5% by mass to 90% by mass with respect to the entire photopolymerizable monomer, and wherein the ink does not include a diluting solvent.

Advantageous Effects of Invention

According to the present invention, the conventional problems may be solved, and a non-aqueous photopolymerizable inkjet ink which involves no skin sensitization and has low viscosity and improved strength in a cured film may be provided.

Also, the non-aqueous photopolymerizable inkjet ink of the present invention is easy to handle because of its weak odor. Even though a small amount of uncured monomer component remains, a coating obtained by using this ink has no problem in regard to skin sensitization and does not cause skin sensitization when it is touched by fingers and so on. Accordingly, a coating with a high level of safety may be provided.

Figure 1:
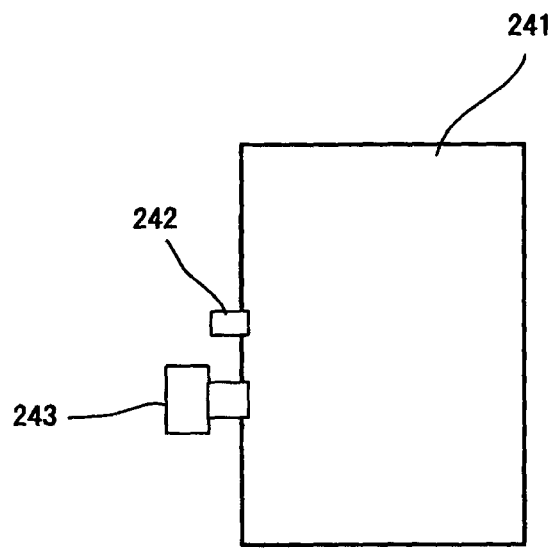
FIG. 1 is a schematic diagram illustrating one example of an ink bag of an ink cartridge of the present invention.

DESCRIPTION OF EMBODIMENTS (Non-Aqueous Photopolymerizable Inkjet Ink)

A non-aqueous photopolymerizable inkjet ink of the present invention (hereinafter, it may also be referred to as an "ink") includes a photopolymerizable monomer, and it further includes other components according to necessity. The non-aqueous photopolymerizable inkjet ink does not include a diluting solvent.

<Photopolymerizable Monomer>

The photopolymerizable monomer is: (a) ethylene glycol dimethacrylate; and (b) caprolactone-modified dipentaerythritol hexaacrylate or ethylene oxide-modified trimethylolpropane trimethacrylate, or both thereof. The photopolymerizable inkjet ink includes the (a) component by 10% by mass to 95% by mass with respect to the entire photopolymerizable monomer and includes the (b) component by 5% by mass to 90% by mass with respect to the entire photopolymerizable monomer.

The present inventors have found a photopolymerizable inkjet ink including diethylene glycol dimethacrylate having a significantly small SI value indicating a degree of sensitization of 1.1 compared to methacrylate as a photopolymerizable monomer having a viscosity appropriate for inkjet discharge and having negative skin sensitization (Japanese Patent Application No. 2010-278177).

The present inventors have newly found that a stronger cured film appropriate for inkjet discharge may be obtained by adding a polyfunctional monomer with three or more functional groups having negative skin sensitization to the diethylene glycol dimethacrylate at an appropriate mixing ratio and by appropriate light irradiation. Here, the SI value is described in detail later.

In particular, they have found that, by adding the caprolactone-modified dipentaerythritol hexaacrylate or the ethylene oxide-modified trimethylolpropane trimethacrylate, or both thereof, as a polyfunctional monomer with three or more functional groups having negative skin sensitization, to the diethylene glycol dimethacrylate at an appropriate mixing ratio, a film having certain strength despite with less amount of light irradiated during curing and that a cured film having more strength may be obtained with irradiation of the same amount of light.

The above photopolymerizable monomer which is negative for skin sensitization refers to a compound corresponding to at least any one of the following skin sensitization evaluations (1) to (2).

(1) A compound having a Stimulation Index (SI value), indicating a degree of sensitization in a skin sensitization test based on the LLNA (Local Lymph Node Assay), of less than 3

(2) A compound evaluated as "negative for skin sensitization" or "no skin sensitization" in its MSDS (Material Safety Data Sheet)

Regarding (1), the compound having a SI value of less than 3 is considered negative for skin sensitization as described in literatures, for example, "Functional Material" (*Kino Zairyou*) 2005, September, Vol. 25, No. 9, p. 55. The lower SI value means lower skin sensitization. Thus, in the present invention, it is preferable to use the monomer having a lower SI value, and the monomer having an SI value of less than 3, preferably 2 or less, and further preferably 1.6 or less is used.

Diethylene glycol dimethacrylate as the (a) component is a bifunctional monomer having negative skin sensitization, which is inexpensive and may be easily procured. Similarly, caprolactone-modified dipentaerythritol hexaacrylate and ethylene oxide-modified trimethylolpropane trimethacrylate as the (b) component is a polyfunctional monomer with three ore more functional groups having negative skin sensitization, which is inexpensive and may be easily procured. A content of the (a) component in the photopolymerizable monomer is not particularly restricted as long as it is 10% by mass to 95% by mass, and it may be appropriately selected according to purpose. Nonetheless, it is preferably 10% by mass to 70% by mass. Also, a content of the (b) component in the photopolymerizable monomer is not particularly restricted as long as it is 5% by mass to 90% by mass, and it may be appropriately selected according to purpose. Nonetheless, it is preferably 30% by mass to 90% by mass.

<Other Components>

The other components are not particularly restricted and may be appropriately selected according to purpose. Nonetheless, other photopolymerizable monomers, photoradical polymerization initiators, polymerization accelerators, colorants and so on are exemplified.

<<Other Photopolymerizable Monomer>>

In addition to those having negative skin sensitization, the following (meth)acrylates and (meth)acryl amides may be used in combination as the other photopolymerizable monomer even though the compounds have some problems of skin sensitization by themselves or they have skin sensitization unconfirmed, as long as it does not cause a problem as an ink.

The other photopolymerizable monomers are not particularly restricted and may be appropriately selected according to purpose. Nonetheless, examples thereof include ethylene glycol di(meth)acrylate, neopentylglycol hydroxypivalate di(meth)acrylate, γ-butyrolactone acrylate, isobornyl (meth) acrylate, formalized trimethylolpropane mono(meth)acrylate, polytetramethylene glycol di(meth)acrylate, trimethylolpropane (meth)acrylate benzoate, diethylene glycol diacrylate, triethylene glycol di(meth)acrylate, tetraethylene glycol di(meth)acrylate, polyethylene glycol di(meth)acrylate [$CH_2$=CH—CO—($OC_2H_4$)n-OCOCH=$CH_2$ (n≈4), idem (n≈9), idem (n≈14), idem (n≈23)], dipropylene glycol di(meth)acrylate, tripropylene glycol di(meth)acrylate, polypropylene glycol dimethacrylate [$CH_2$=C($CH_3$)—CO—($OC_3H_6$)n-OCOC($CH_3$)=$CH_2$ (n≈7)], 1,3-butanediol diacrylate, 1,4-butanediol di(meth)acrylates, 1,6-hexanediol di(meth)acrylate, 1,9-nonanediol di(meth)acrylate, neopentyl glycol di(meth)acrylates, tricyclodecanedimethanol di(meth)acrylates, propylene oxide-modified bisphenol A di(meth)acrylate, polyethylene glycol di(meth)acrylate, dipentaerythritol hexa(meth)acrylate, (meth)acryloyl morpholine, 2-hydroxypropyl (meth)acrylamide, propylene oxide-modified tetramethylolmethane tetra(meth)acrylate, dipentaerythritol hydroxypenta(meth)acrylate, caprolactone-modified dipentaerythritol hydroxypenta(meth)acrylate, ditrimethylolpropane tetra(meth)acrylate, pentaerythritol tetra(meth)acrylate, trimethylolpropane triacrylate, ethylene oxide-modified trimethylolpropane triacrylate, propylene oxide-modified trimethylolpropane tri(meth)acrylate, caprolactone-modified trimethylolpropane tri(meth)acrylate, pentaerythritol tri(meth)acrylate, tris(2-hydroxyethyl)isocyanurate tri(meth)acrylate, ethoxylated neopentyl glycol di(meth)acrylate, propylene oxide-modified neopentyl glycol di(meth)acrylate, propylene oxide-modified glyceryl tri(meth)acrylate, polyester di(meth)acrylate, polyester tri(meth)acrylate, polyester tetra(meth)acrylate, polyester penta(meth)acrylate, polyester poly(meth)acrylate, N-vinylcaprolactam, N-vinylpyrrolidone, N-vinylformamide, polyurethane di(meth)acrylate, polyurethane tri(meth)acrylate, polyurethane tetra(meth)acrylate, polyurethane penta(meth)acrylate, polyurethane poly(meth)acrylate and so on.

<<Photoradical Polymerization Initiator>>

A photoradical polymerization initiator is preferably used in the non-aqueous photopolymerizable inkjet ink of the present invention. The photoradical polymerization initiator is not particularly restricted and may be appropriately selected according to purpose. Nonetheless, it is more preferable to use those having negative skin sensitization.

(Meth)acrylic esters and (meth)acryl amides are known to be ionically polymerizable. An ion polymerization initiator is generally expensive. In addition, since it generates strong acids or strong alkalis slightly even in a state where no light is irradiated, special care must be taken such as to impart resistance to acids and alkalis in ink supply paths in an inkjet coating system. Accordingly, there is a restriction in selecting members which constitute the inkjet coating system.

To the contrary, since it is possible to use a photoradical polymerization initiator which is inexpensive and does not generate strong acids or strong alkalis for the ink of the present invention, the ink may be manufactured at a reasonable cost, and selection of members which constitute the inkjet coating system is easy. Here, a polymerization reaction proceeds without using a polymerization initiator if a high-energy light source such as electron beam, α-ray, β-ray, γ-ray and X-ray is used. However, this is a conventionally heretofore known issue, and it is not particularly explained in the present invention.

As the photoradical polymerization initiator, a molecule-cleavage photopolymerization initiator and a hydrogen-abstraction photopolymerization initiator may be exemplified.

Examples of the molecule-cleavage photopolymerization initiator include: 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxy)-p-phenyl]-2-hydroxy-2-methyl-1-propan-1-one, 2-hydroxy-1-{4-[4-

(2-hydroxy-2-methylpropionyl)benzyl]phenyl}-2-methyl-1-propan-1-one, phenylglyoxylic acid methyl ester, 2-methyl-1-[4-(methylthio)phenyl]-2-morpholinopropan-1-one, 2-benzyl-2-dimethylamino-1-(4-morpholinophenyl)butanone-1,2-dimethyl amino-2-(4-methylbenzyl)-1-(4-morpholin-4-yl-phenyl)butan-1-one, bis(2,4,6-trimethylbenzoyl)phenylphosphine oxide, bis(2,6-dimethoxybenzolyl)-2,4,4-trimethyl-pentylphosphine oxide, 2,4,6-trimethylbenzoylphosphine oxide, 1,2-octanedion-[4-(phenylthio)-2-(o-benzoyloxime)], ethanone-1-[9-ethyl-6-(2-methylbenzoyl)-9H-carbazol-3-yl]-1-(O-acetyloxime), [4-(methylphenylthio)phenyl]phenylmethanone and so on.

Examples of the hydrogen-abstraction photopolymerization initiator include: benzophenone compounds such as benzophenone, methylbenzophenone, methyl-2-benzoylbenzoate, 4-benzoyl-4'-methyldiphenyl sulfide, phenylbenzophenone and so on; and thioxanthone compounds such as 2,4-diethylthioxanthone, 2-chlorothioxanthone, isopropylthioxanthone, 1-chloro-4-propylthioxanthone and so on.

The photoradical polymerization initiator having negative skin sensitization is not particularly restricted as long as it is a compound corresponding to at least any one of the skin sensitization evaluation (1) to (2), and it may be appropriately selected according to purpose. Examples thereof include 2-dimethylamino-2-(4-methylbenzyl)-1-(4-morpholin-4-yl-phenyl)butan-1-one, 2-methyl-1-[4-(methylthio)phenyl]-2-morpholinopropan-1-one, 2-benzyl-2-dimethylamino-1-(4-morpholinophenyl)butanone-1,2,4-diethyl thioxanthone and so on. These may be used alone or in combination of two or more.

<<Polymerization Accelerator>>

Amines may be used in combination as the polymerization accelerator with the photoradical polymerization initiator.

Examples of the polymerization accelerator include ethyl p-dimethylaminobenzoate, 2-ethylhexyl p-dimethylaminobenzoate, methyl p-dimethylaminobenzoate, 2-dimethylaminoethyl benzoate, butoxyethyl p-dimethylaminobenzoate and so on.

<<Colorant>>

The non-aqueous photopolymerizable inkjet ink may be a clear ink which does not include a colorant, or it may include the colorant according to necessity. In a case a clear ink which is required to be colorless and transparent, it is desirable to use the materials such as polymerization initiator with less coloration.

The colorant is not particularly restricted, and various color pigments such as heretofore known inorganic pigments, organic pigments, black pigments, yellow pigments, magenta pigments, cyan pigments, white pigments and so on may be appropriately selected according to purpose.

Examples of the black pigments include carbon black manufactured by a furnace method or a channel method.

Examples of the yellow pigments include pigments of Pigment Yellow series such as Pigment Yellow 1, Pigment Yellow 2, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 75, Pigment Yellow 83, Pigment Yellow 93, Pigment Yellow 95, Pigment Yellow 97, Pigment Yellow 98, Pigment Yellow 114, Pigment Yellow 120, Pigment Yellow 128, Pigment Yellow 129, Pigment Yellow 138, Pigment Yellow 150, Pigment Yellow 151, Pigment Yellow 154, Pigment Yellow 155, Pigment Yellow 180 and so on.

Examples of the magenta pigments include pigments of Pigment Red series such as Pigment Red 5, Pigment Red 7, Pigment Red 12, Pigment Red 48 (Ca), Pigment Red 48 (Mn), Pigment Red 57 (Ca), Pigment Red 57:1, Pigment Red 112, Pigment Red 122, Pigment Red 123, Pigment Red 168, Pigment Red 184, Pigment Red 202, Pigment Violet 19 and so on.

Examples of the cyan pigments include pigments of Pigment Blue series such as Pigment Blue 1, Pigment Blue 2, Pigment Blue 3, Pigment Blue 15, Pigment Blue 15:3, Pigment Blue 15:4, Pigment Blue 16, Pigment Blue 22, Pigment Blue 60, Vat Blue 4, Vat Blue 60 and so on.

Examples of the white pigments include: sulfates of alkaline earth metals such as barium sulfate; carbonates of alkaline earth metals such as calcium carbonate; silicas such as fine-powder silicic acid and synthetic silicates; calcium silicate, alumina, alumina hydrates, titanium oxide, zinc oxide, talc, clay and so on.

Also, various inorganic pigments or organic pigments may be used according to necessity in view of physical properties.

Further, in the non-aqueous photopolymerizable inkjet ink, it is possible to use as the other components, according to necessity: polymerization inhibitors such as 4-methoxy-1-naphthol, methylhydroquinone, hydroquinone, t-butylhydroquinone, di-t-butylhydroquinone, methoquinone, 2,2'-dihydroxy-3,3'-di-(a-methylcyclohexyl)-5,5'-dimethyl-diphenylmethane, p-benzoquinone, di-t-butyl-diphenylamine, 9,10-di-n-butoxyanthracene, 4,4'-[1,10-dioxo-1,10-decanediylbis(oxy)]bis[2,2,6,6-tetramethyl]-1-piperidinyloxy and so on; surfactants or polymeric pigment disparsants containing a polar group such as higher fatty acid esters containing polyether, an amino group, a carboxyl group or a hydroxyl group, polydimethylsiloxane compounds containing polyether, an amino group, a carboxyl group or a hydroxyl group in a side chain or at an end, and fluoroalkyl compounds containing polyether, an amino group, a carboxyl group or a hydroxyl group.

Physical properties of the non-aqueous photopolymerizable inkjet ink are not particularly restricted and may be appropriately selected according to purpose. Nonetheless, it is desirable that they meet required specifications of the inkjet discharge head to be used. Various discharge heads are commercially available from many manufacturers, including ones possessing a wide range of temperature control function.

In light of such circumstances, the ink has a viscosity of preferably 2 mPa·s to 150 mPa·s. Especially, the viscosity at 25° C. is preferably 5 mPa·s to 18 mPa·s. However, as above, it is also possible to make use of the temperature control function possessed by the discharge heads. When the viscosity is too high at 25° C., the head may be heated to decrease the viscosity of the ink according to necessity. Assuming this, and supposing the heating condition is 60° C., the viscosity of the ink at 60° C. is preferably 2 mPa·s to 20 mPa·s, and more preferably 5 mPa·s to 18 mPa·s.

The viscosity of the ink is considered to be successfully reduced, provided that the ink satisfies the viscosity of 5 mPa·s to 18 mPa·s at 25° C. or 2 mPa·s to 20 mPa·s at 60° C.

Also, regarding film strength of a film formed by curing the ink based on scratch hardness by a pencil method indicated by JIS-K-5600-5-4, film strength is preferably pencil hardness of B in a case of curing with an illuminance of 0.2 mW/cm$^2$ and an irradiation intensity of 1,200 mJ/cm$^2$; film strength is more preferably pencil hardness of HB in a case of curing with an illuminance of 0.2 mW/cm$^2$ and an irradiation intensity of 800 mJ/cm$^2$; and film strength is further more preferably pencil hardness of B in a case of curing with an illuminance of 0.2 mW/cm² and an irradiation intensity of 400 mJ/cm².

Strength of the cured film is considered to be successfully improved if film strength is the above preferable film strength.

(Ink Cartridge)

An ink cartridge of the present invention includes the above ink of the present invention and a container, and it further includes other members such as ink bag according to necessity.

An ink of the present invention may be used in a container, and it is used as an ink cartridge. Thereby, it is unnecessary to touch an ink directly in operations such as ink exchange, and there is no need to worry about stains on fingers or clothes. Also, it is possible to prevent foreign matters such as dust from entering into the ink.

The container is not particularly restricted, and its shape, structure, size, material and so on may be appropriately selected according to purpose. For example, the container preferably includes an ink bag formed of an aluminum laminated film or resin film.

Figure 2:
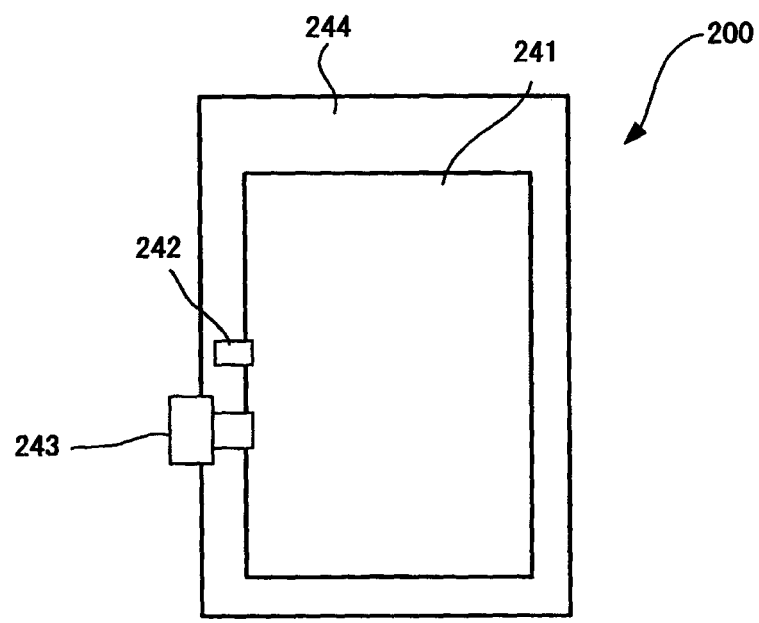
FIG. 2 is a schematic diagram illustrating one example of an ink cartridge of the present invention containing an ink bag.

The above ink cartridge is explained in reference to FIG. 1 and FIG. 2. FIG. 1 is a schematic diagram illustrating one example of an ink bag 241 of the ink cartridge, and FIG. 2 is a schematic diagram illustrating an ink cartridge 200 that the ink bag 241 of FIG. 1 is contained in a cartridge case 244.

As illustrated in FIG. 1, an ink is filled in the ink bag 241 from an ink inlet 242, and after the air remaining in the ink bag is discharged, the ink inlet 242 is closed by fusion. In use, the ink is supplied to the apparatus by putting a needle of the apparatus body into an ink outlet 243 of a rubber member. The ink bag 241 is formed of a packaging material such as aluminum laminated film having no air permeability. Then, as illustrated in FIG. 2, usually, it is contained in a plastic cartridge case 244, which is used as an ink cartridge 200 by detachably mounting on various inkjet recording apparatuses.

It is preferable that the ink cartridge of the present invention is detachably mounted on an inkjet recording apparatus. Thereby, ink replenishment or replacement may be simplified, and workability may be improved.

A coated substrate is not particularly restricted and may be appropriately selected according to purpose. Examples thereof include paper, plastics, metals, ceramics, glass and composite materials thereof. Since an effect of penetration drying may be expected with a substrate having an absorbency of high-quality paper, it is possible to use therewith a water-based ink or an oil-based ink which do not dry fast. To the contrary, with an impermeable substrate such as gloss-coated paper, plastic films, plastic moldings, ceramics, glass, metals and so on, it is more practical to use an ink which dries fast.

Accordingly, the impermeable substrate is preferable as the coated substrate since the ink of the present invention is cured immediately by light irradiation. Among them, polyethylene, polypropylene, polyethylene terephthalate, polycarbonate, an ABS resin, polyvinyl chloride, polystyrene, other polyester, polyamide, vinyl materials, and plastic films or plastic moldings made of composite materials thereof are more preferable.

EXAMPLES

Hereinafter, the present invention is specifically explained by demonstrating examples and comparative examples, but the present invention is not to be limited by these examples.

<Evaluation Method of SI Value>

An SI value of a photopolymerizable monomer and so on was measured in the below described manner according to a skin sensitization test based on the LLNA (Local Lymph Node Assay) method.

[Test Materials]

<<Positive Control>>

As the positive control, α-hexylcinnamaldehyde (HCA; manufactured by Wako Pure Chemical Industries, Ltd.) was used.

<<Vehicle>>

As a vehicle, a mixture of acetone (manufactured by Wako Pure Chemical Industries, Ltd.) and olive oil (manufactured by Fudimi Pharmaceutical Co Ltd.) at a volume ratio of 4:1.

<<Animals Used>>

Before treated with the test substances, the positive control or the vehicle control, female mice were acclimated for 8 days including 6-day quarantine. No abnormalities were found in all the animals during the quarantine/acclimation period. Based on the body weights measured 2 days before the initiation of sensitization, they were categorized into 2 groups (4 mice/group) by the body weight stratified random sampling method so that the body weight of each individual was within ±20% of the average body weight of all the individuals. Each animal was 8 weeks old to 9 weeks old at the time of the initiation of sensitization. The animals remaining after the categorization were excluded from the test.

The animals were individually identified by application of oil ink to their tale throughout the test period, and also their cages were labeled for identification.

<<Housing Environment>>

Throughout the housing period including the quarantine/acclimation period, the animals were housed in an animal room with barrier system, which was set as follows: 21° C. to 25° C. in temperature, 40% to 70% in relative humidity, 10 times/hour to 15 times/hour in frequency of air circulation, and 12 hours in lighting cycle (lighting from 7:00 to 19:00). The housing cages used were those made of polycarbonate, and four animals were housed in each cage.

The animals were given ad libitum solid diet for laboratory animals MF (manufactured by Oriental Yeast Co., Ltd.). Also, using a water-supply bottle, they were given ad libitum tap water in which sodium hypochlorite (PURELOX, manufactured by OYALOX Co., Ltd.) had been added so that the chlorine concentration was about 5 ppm. Bedding used was SUNFLAKE (fir tree, shavings obtained with a power planer) (manufactured by Charles River Inc.). The diet and feeding equipment were sterilized with an autoclave (121° C., 30 min) before use.

The cage and bedding were replaced with new ones at the times of the categorization and the removal of the auricular lymph node (i.e., the time when the animals were transferred from the animal room), and the water-supply bottle and rack were replaced with new ones at the time of the categorization.

[Test Method]

<<Group Composition>>

The group composition used for the measurement of the SI value is shown in Table 1.

TABLE 1

| Test group | Sensitization substance | Sensitization dose (μL/auricle) | Times of sensitization | Number of animals (animal No.) |
|---|---|---|---|---|
| Vehicle control group | Vehicle only | 25 | Once/day × 3 days | 4 (1-4) |
| Positive control group | 25.0% HCA | 25 | Once/day × 3 days | 4 (5-8) |

[Preparation]

<<Test Substance>>

Table 2 shows the amount of the test substance. The test substance was weighed in a measuring flask, and the volume of the test substance was adjusted to 1 mL with a vehicle. The thus-prepared solution was placed in a light-shielded airtight container (made of glass).

TABLE 2

| | Concentration after adjustment (w/v %) | Mass of test substance (g) |
|---|---|---|
| Test substance | 50.0 | 0.5 |

<<Positive Control>>

0.25 g of HCA was accurately weighed, and a vehicle was added to the HCA to have the volume of 1 mL, to thereby prepare a 25.0 w/v % solution. The thus-prepared solution was placed in a light-shielded airtight container (made of glass).

<<BrdU>>

In a measuring flask, 200 mg of 5-bromo-2'-deoxyuridine (BrdU, manufactured by NACALAI TESQUE, INC.) was accurately weighed. Then, physiological saline (manufactured by OTSUKA PHARMACEUTICAL CO., LTD.) was added to the measuring flask and dissolved through application of ultrasonic waves. The volume of the resultant solution was adjusted to 20 mL to prepare a 10-mg/mL solution (BrdU preparation solution). The preparation solution was sterilized through filtration with a sterilized filtration filter and placed in a sterilized container.

<<Preparation Day and Storage Period>>

The positive control preparation was prepared on the day before the initiation of sensitization, and stored in a cold place except in use. The vehicle and the test substance preparations were prepared on the day of sensitization. The BrdU preparation solution was prepared 2 days before administration and stored in a cold place until the day of administration.

[Sensitization and Administration of BrdU]

<<Sensitization>>

Each (25 μL) of the test substance preparations, the positive control preparation and the vehicle was applied to both auricles of each animal using a micropipette. This treatment was performed once a day for three consecutive days.

<<Administration of BrdU>>

About 48 hours after the final sensitization, the BrdU preparation (0.5 mL) was intraperitoneally administered once to each animal.

[Observation and Examination]

<<General Conditions>>

All the animals used for the test were observed once or more times a day from the day of the initiation of sensitization to the day of the removal of the auricular lymph node (i.e. the day when the animals were transferred from the animal room). Notably, the observation day was counted from the day of the initiation of sensitization being regarded as Day 1.

<<Measurement of Body Weight>>

The body weight of each animal was measured on the day of the initiation of sensitization and on the day of the removal of the auricular lymph node (i.e. the day when the animals were transferred from the animal room). Also, the average of the body weights and the standard error thereof were calculated for each group.

<<Removal of Auricular Lymph Node and Measurement of Mass Thereof>>

About 24 hours after the administration of BrdU, the animals were allowed to undergo euthanasia, and their auricular lymph nodes were sampled. The surrounding tissue of each auricular lymph node was removed, and the auricular lymph nodes from both the auricles were weighed at one time. Also, the average of the weights of the auricular lymph nodes and the standard error thereof were calculated for each group. After the measurement of the weights, the auricular lymph nodes of each individual were stored in a frozen state using a BIO MEDICAL FREEZER set to −20° C.

<<Measurement of BrdU Intake>>

After returned to room temperature, the auricular lymph nodes were mashed with the gradual addition of physiological saline, and suspended therein. The thus-obtained suspension was filtrated and then dispensed into the wells of a 96-well microplate, with 3 wells being used per individual. The thus-dispensed suspensions were measured for intake of BrdU by the ELISA method. The reagents used were those of a commercially available kit (Cell Proliferation ELISA, BrdU colorimetric, Cat. No. 1647229, manufactured by Roche Diagnostics Inc.). A multiplate reader (FLUOSTAR OPTIMA, manufactured by BMG LABTECH Inc.) was used to measure the absorbance of each well (OD: 370 nm to 492 nm, corresponding to the intake of BrdU), and the average of the absorbance of the 3 wells for each individual was used as the measurement of BrdU for the individual.

[Evaluation of Results]

<<Calculation of Stimulation Index (SI)>>

As shown in the following formula, the measurement of BrdU intake for each individual was divided by the average of the measurements of BrdU intake in the vehicle control group to calculate the SI value for the individual. The SI value of each test group was the average of the SI values of the individuals. Also, the standard error of the SI values was calculated for each test group. Notably, the SI value was rounded at the second decimal place and shown to the first decimal place.

$$SI = \frac{\text{Avg. of measurements of } BrdU \text{ intake for each individual } (avg. \text{ of 3 wells})}{\text{Avg. of measurements of } BrdU \text{ intake in the vehicle control group } (avg. \text{ of 4 animals})}$$

Examples 1 to 10

Comparative Examples 1 to 2

Inks were obtained by mixing the following materials (a) to (c) at a mixing ratio indicated in the respective columns of Examples 1 to 10 and Comparative Examples 1 to 2 in Table 3 (numbers are in parts by mass).

(a) Diethylene glycol dimethacrylate as a bifunctional monomer having negative skin sensitization (b) Caprolactone-modified dipentaerythritol hexaacrylate and ethylene oxide-modified trimethylolpropane trimethacrylate as a polyfunctional monomer having negative skin sensitization (c) Photoradical polymerization initiator having negative skin sensitization Details of a, b1 to b2, c1 to c3 in Table 3 are as follows. A value in brackets at the end is the SI value in the LLNA test of the skin sensitization test (1). Also, a description of "negative skin sensitization" or "no skin sensitization" in brackets at the end denotes that evaluation of "negative skin sensitization" or "no skin sensitization" in the MSDS (Material Safety Data Sheet) in the skin sensitization test (2). The evaluation method of the SI value is as described above.

a: Diethylene glycol dimethacrylate
"2G", manufactured by Shin-Nakamura Chemical Co., Ltd. (1.1)

b1: Caprolactone-modified dipentaerythritol hexaacrylate "DPCA60", manufactured by Nippon Kayaku Co., Ltd. (Negative skin sensitization, evaluated in the MSDS) (Test method: OECD test guideline 406)

b2: Ethylene oxide-modified trimethylolpropane trimethacrylate "TMPT-3EO", manufactured by Shin-Nakamura Chemical Co., Ltd. (1.0)

c1: 1-Hydroxy-cyclohexylphenylketone
(No skin sensitization, evaluated in the MSDS)
(Test method: OECD test guideline 406)

c2: 2-Dimethylamino-2-(4-methylbenzyl)-1-(4-morpholin-4-il-phenyl) butan-1-one
(No skin sensitization, evaluated in the MSDS)
(Test method: OECD test guideline 406)

c3: Equimolar mixture of 2,4-diethylthioxanthone (1.4) and 2-ethylhexyl p-dimethylaminobenzoate
(No skin sensitization, evaluated in the MSDS)
(Test method: OECD test guideline 406)

For each ink, the viscosity at 25° C., 45° C. and 60° C. (mPa·s) and the film strength were measured. Results are shown in Table 3.

The viscosity was measured by setting a temperature of constant-temperature circulating water was set at 25° C., 45° C. or 60° C. by a cone-plate rotary viscometer manufactured by Toki Sangyo Co., Ltd. The temperature of 25° C. assumes a typical room temperature, and the temperatures of 45° C. and 60° C. assumes specifications of commercial inkjet discharge heads such as GEN4 manufactured by Ricoh Printing Systems, Ltd., for example, with which heating is possible.

Here, the viscosity measurement at 45° C. or 60° C. was omitted if the inks had a sufficiently low viscosity without heating.

Regarding the film strength, the ink was subjected to inkjet discharge on a commercially available polycarbonate film ("IUPILON E-2000", manufactured by Mitsubishi Engineering-Plastics Corporation, having a thickness of 100 μm), which was cured by light irradiation by an UV irradiation device "LH6", manufactured by Fusion Systems Co., Ltd. with an illuminance of 0.2 mW/cm$^2$, and thereby a solid film was obtained. This film was evaluated for scratch hardness by the pencil method indicated by JIS-K-5600-5-4. The pencil hardness is H, F, HB and B in a decreasing order of hardness.

First, the ink was handled as follows. The ink was placed in an aluminum pouch bag having a shape illustrated in FIG. 1, which was sealed such that no air bubbles were entrained therein. The sealed pouch bag with the ink was placed in a plastic in cartridge illustrated in FIG. 2. In a casing for containing this cartridge, an ink path was arranged from the cartridge to GEN4 head manufactured by Ricoh Printing Systems, Ltd. Thereby, the ink was subjected to inkjet discharge, and a solid film was prepared. Here, an application amount of ink droplets was adjusted so that the solid film had a thickness of about 30 μm.

Thus prepared solid printed film was cured at light conditions of 400 mJ/cm$^2$, 800 mJ/cm$^2$ and 1,200 mJ/cm$^2$ in a wavelength region corresponding to an LVA region, and it was subjected to the film strength test.

TABLE 3

| Material | | Comp. Ex. 1 | Ex. 1 | Ex. 2 | Ex. 3 | Comp. Ex. 2 | Ex. 4 | Ex. 5 | Ex. 6 | Ex. 7 | Ex. 8 | Ex. 9 | Ex. 10 |
|---|---|---|---|---|---|---|---|---|---|---|---|---|---|
| a | | 100 | 95 | 80 | 50 | 8 | 70 | 10 | 50 | 80 | 80 | 80 | 80 |
| b | b1 | | 5 | 20 | 50 | 92 | 10 | | | 20 | 20 | 20 | 20 |
| | b2 | | | | | | 20 | 90 | 50 | | | | |
| c | c1 | 20 | 20 | 20 | 20 | 20 | 20 | 20 | 20 | | 10 | | 10 |
| | c2 | | | | | | | | | 20 | | 20 | |
| | c3 | | | | | | | | | | 10 | | 10 |
| carbon black*1 | | | | | | | | | | | | 2 | 2 |
| viscosity @25° C. (mPa · s) | | 7 | 8 | 16 | 60 | 700 | 16 | 18 | 16 | 22 | 18 | 25 | 21 |
| viscosity @45° C. (mPa · s) | | *2 | *2 | 8 | 24 | 200 | 8 | 15 | 8 | 10 | 9 | 11 | 10 |
| viscosity @60° C. (mPa · s) | | *2 | *2 | *2 | 15 | 80 | *2 | 9 | *2 | *2 | *2 | *2 | *2 |
| Ejection temperature of head | | 25° C. | 25° C. | 45° C. | 60° C. | 60° C. | 45° C. | 60° C. | 45° C. | 45° C. | 45° C. | 45° C. | 45° C. |
| Film strength (400 mJ/cm$^2$) | | *3 | *3 | *3 | HB | *4 | *3 | B | *3 | B | *3 | *3 | *3 |
| Film strength (800 mJ/cm$^2$) | | *3 | *3 | HB | F | *4 | H | H | H | F | HB | B | *3 |
| Film strength (1,200 mJ/cm$^2$) | | *3 | F | F | H | *4 | H | H | H | H | F | HB | B |

*1 The value indicates an amount in a state including carbon black "#10" manufactured by Mitsubishi Chemical Corporation and a dispersant "SOLSPERSE 32000" manufactured by Lubrizol Japan Ltd. with a mass ratio of 3:1.
*2: The viscosity was not measured since discharge was possible below the temperature.
*3: Uncured (with liquid residue or tack).
*4: No evaluation was made since discharge was not possible.

From Examples 1 to 3, by using the bifunctional monomer a and the monomer b1 having a high viscosity but considered to be easily polymerized due to its 6 functional groups, it was confirmed that a film having sufficient strength (pencil hardness of F or H) may be obtained by light irradiation at 1,200 mJ/cm². However, as in Comparative Example 1, a sufficiently cured film could not be obtained under the above evaluation conditions when the polyfunctional monomer with three or more functional groups was not used in combination.

Also, it was confirmed a film having certain strength with less irradiation intensity or a film having more strength with the same irradiation intensity may be obtained by adjusting the blending ratio of the b1.

However, as in Comparative Example 2, it was confirmed that inkjet discharge was not possible due to excessively high viscosity of the ink with an excess amount of the b1.

From Examples 4 to 6, by adjusting the mixing ratio of the bifunctional monomer a and the polyfunctional monomers b, it was confirmed that the film having a pencil hardness of H by light irradiation at 1,200 mJ/cm² may be obtained with the ink having a viscosity lower than Example 3. There is a possibility that the heating conditions may be eased if the ink has a low viscosity, which is preferable in view of energy conservation. Also, by light irradiation at 800 mJ/cm², a film having a pencil hardness of H was obtained, which was stronger than the other examples.

From Examples 2, 7 and 8, it was confirmed that different types of photoradical polymerization initiators may be used. Photoradical polymerization initiators may be appropriately selected according to necessity because they vary in terms of their solubility, degree of coloration, price and so on depending on their types.

From Examples 2, 9 and 10, although they are inferior in comparison with those without colorants, it was confirmed that those with colorants are inferior compared to those without colorants but they could provide films with a certain strength if a selection of the photoradical polymerization initiator was appropriate.

Here, odor of the inks of all the examples and the comparative examples was weak, and consideration of special handling was not required.

Also, Table 3 shows the results of light irradiation with an illuminance of 0.2 mW/cm². For example, in Example 1, a case with an illuminance of 2 mW/cm² and an irradiation-intensity of 1,200 mJ/cm² resulted in a non-cured film. Also, in Example 3 with an illuminance of 2 mW/cm², a case with an irradiation intensity of 1,200 mJ/cm² resulted in film strength of a pencil hardness of H, and a case with an irradiation intensity of 800 mJ/cm² resulted in film strength of a pencil hardness of F, and no difference was observed from the case of the illuminance of 0.2 mW/cm². However, a case with an irradiation intensity of 400 mJ/cm² resulted in film strength of a pencil hardness of less than 6B. Also, in Example 4 with an illuminance of 2 mW/cm², a case with an irradiation intensity of 1,200 mJ/cm² resulted in film strength of a pencil hardness of HB, and a case with an irradiation intensity of 800 mJ/cm² resulted in film strength of a pencil hardness of B.

As described above, it was confirmed that light irradiation with less illuminance was more effective in order to obtain a film having a certain strength with less irradiation intensity or a film having more strength with the same irradiation intensity.

Aspects of the present invention are the following.

<1> A non-aqueous photopolymerizable inkjet ink, including as a photopolymerizable monomer:
(a) ethylene glycol dimethacrylate; and
(b) caprolactone-modified dipentaerythritol hexaacrylate or ethylene oxide-modified trimethylolpropane trimethacrylate, or both thereof,
wherein the ink includes the (a) component by 10% by mass to 95% by mass with respect to the entire photopolymerizable monomer, and the ink includes the (b) component by 5% by mass to 90% by mass with respect to the entire photopolymerizable monomer, and
wherein the ink does not include a diluting solvent.
<2> An ink cartridge, including:
the inkjet ink according to <1>; and
a container.

The invention claimed is:

1. A photopolymerizable inkjet ink, comprising as a photopolymerizable monomer:
(a) diethylene glycol dimethacrylate; and
(b) at least one polyfunctional monomer with three or more functional groups selected from the group consisting of caprolactone-modified dipentaerythritol hexaacrylate and ethylene oxide-modified trimethylolpropane trimethacrylate,
wherein the photopolymerizable inkjet ink is negative for skin sensitization,
and wherein an amount of the (a) component in the ink is 10% by mass to 95% by mass with respect to the entire photopolymerizable monomer, and an amount of the (b) component in the ink is 5% by mass to 90% by mass with respect to the entire photopolymerizable monomer.

2. The photopolymerizable inkjet ink according to claim 1, wherein the ink does not include a diluting solvent.

3. The photopolymerizable inkjet ink according to claim 1, further comprising a photoradical polymerization initiator, wherein the photoradical polymerization initiator is at least one selected from the group consisting of 1-hydroxy-cyclohexyl phenyl ketone, 2-dimethylamino-2-(4-methylbenzyl)-1-(4-morpholin-4-yl-phenyl)butan-1-one, 2-methyl-1-[4-(methylthio)phenyl]-2-morpholinopropan-1-one, 2- benzyl-2-dimethylamino-1-(4-morpholinophenyl) butanone-1,2,4-diethylthioxanthone and 2,4-diethylthioxanthone.

4. The photopolymerizable inkjet ink according to claim 1, further comprising a colorant.

5. The photopolymerizable inkjet ink according to claim 1, wherein the ink has a viscosity of 5 mPa·s to 18 mPa·s at 25° C.

6. The photopolymerizable inkjet ink according to claim 1, further comprising a photoradical polymerization initiator, wherein the photoradical polymerization initiator is at least one selected from the group consisting of 2-dimethylamino-2-(4-methylbenzyl)-1-(4-morpholin-4-yl-phenyl)butan-1-one, 2-benzyl-2-dimethylamino-1-(4-morpholinophenyl)butanone-1,2,4-diethylthioxanthone and 2,4-diethylthioxanthone.

7. The photopolmerizable inkjet ink according to claim1, wherein the ink has a viscosity of 2mPa·s at 60° C.

8. An ink cartridge, comprising:
an inkjet ink; and
a container,
wherein the inkjet ink is a photopolymerizable inkjet ink which comprises as a photopolymerizable monomer:
(a) ethylene glycol dimethacrylate; and
(b) at least one polyfunctional monomer with three or more functional groups selected from the group consisting of caprolactone-modified dipentaerythritol hexaacrylate and ethylene oxide-modified trimethylolpropane trimethacrylate, wherein the photopolymerizable inkjet ink is negative for skin sensitization, and wherein an amount of the (a) component in the ink is 10% by mass to 95% by mass with respect to the entire photopolymerizable monomer, and an amount of the (b) component in the ink is 5% by mass to 90% by mass with respect to the entire photopolymerizable monomer.

9. An inkjet discharging device, comprising:

an ink cartridge, wherein the ink cartridge comprises:

an inkjet ink; and a container, wherein the inkjet ink is a photopolymerizable inkjet ink which comprises as a photopolymerizable monomer:

(a) ethylene glycol dimethacrylate; and (b) at least one polyfunctional monomer with three or more functional groups selected from the group consisting of caprolactone-modified dipentaerythritol hexaacrylate and ethylene oxide-modified trimethylolpropane trimethacrylate, wherein the photopolymerizable inkjet ink is negative for skin sensitization, and wherein an amount of the (a) component in the ink is 10% by mass to 95% by mass with respect to the entire photopolymerizable monomer, and an amount of the (b) component in the ink is 5% by mass to 90% by mass with respect to the entire photopolymerizable monomer.

* * * * *